US009818454B1

(12) United States Patent
Albrecht et al.

(10) Patent No.: US 9,818,454 B1
(45) Date of Patent: Nov. 14, 2017

(54) HERMETICALLY-SEALED DATA STORAGE DEVICE FOR INCREASED DISK DIAMETER

(71) Applicant: HGST Netherlands B.V., Amsterdam (NL)

(72) Inventors: Thomas R. Albrecht, San Jose, CA (US); Darya Amin-Shahidi, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/189,998

(22) Filed: Jun. 22, 2016

(51) Int. Cl.
*G11B 33/14* (2006.01)
*G11B 33/02* (2006.01)
*G11B 25/04* (2006.01)

(52) U.S. Cl.
CPC .......... *G11B 33/1446* (2013.01); *G11B 25/04* (2013.01); *G11B 33/027* (2013.01); *G11B 33/1466* (2013.01)

(58) Field of Classification Search
None
See application file for complete search history.

(56) References Cited

U.S. PATENT DOCUMENTS

| 4,624,752 A | 11/1986 | Arrowsmith et al. |
| 5,084,123 A | 1/1992 | Curtis |
| 5,233,491 A | 8/1993 | Kadonaga et al. |
| 5,454,157 A | 10/1995 | Ananth et al. |
| 5,600,509 A * | 2/1997 | Kawakami ........... G11B 33/121 360/97.21 |
| 5,696,648 A * | 12/1997 | Jeong et al. ....... G11B 33/1466 360/99.22 |
| 5,793,566 A | 8/1998 | Scura et al. |
| 6,226,143 B1 | 5/2001 | Stefansky |
| 6,266,207 B1 | 7/2001 | Iwahara et al. |
| 6,271,985 B1 | 8/2001 | Ishikawa |
| 6,525,899 B2 | 2/2003 | Hearn et al. |
| 6,693,767 B1 | 2/2004 | Butler |
| 6,721,128 B1 | 4/2004 | Koizumi et al. |
| 6,762,909 B2 | 7/2004 | Albrecht et al. |

(Continued)

OTHER PUBLICATIONS

Fujio et al., Hard Disk Drive Enclosure Sealing for Electromagnetic Noise Immunity, Jun. 1, 1994, IBM Technical Disclosure Bulletin, vol. 37, No. 06A, pp. 599-600.*

(Continued)

*Primary Examiner* — Craig A. Renner
(74) *Attorney, Agent, or Firm* — John D. Henkhaus

(57) ABSTRACT

A data storage device involves inner surfaces of sidewalls of a second cover overlapping with and adhesively bonded with the outer surfaces of sidewalls of an enclosure base having an uppermost top surface, where the second cover or an underlying first cover are removably adhered to the uppermost top surface of the base. The removable adhesive bond may comprise a pressure-sensitive adhesive, which can provide for reworkability during the manufacturing and testing process. The second cover-to-base sidewall bond may form a hermetic seal between the second cover and the base. Hence, a thinner base sidewall adjacent to the recording disks is enabled, leaving more space available for larger-diameter recording disks within a standard form factor, hermetically-sealed storage device, which may be filled with a lighter-than-air gas.

15 Claims, 6 Drawing Sheets

(56) References Cited

U.S. PATENT DOCUMENTS

| | | |
|---|---|---|
| 6,820,272 B2 | 11/2004 | Wang |
| 7,119,984 B2 | 10/2006 | Macleod et al. |
| 7,218,473 B2 | 5/2007 | Bernett et al. |
| 7,362,541 B2 | 4/2008 | Bernett et al. |
| 7,522,375 B2 | 4/2009 | Tsuda et al. |
| 7,692,891 B2 | 4/2010 | Hatchett et al. |
| 7,876,528 B2 | 1/2011 | Uefune et al. |
| 7,929,247 B2 | 4/2011 | Uefune et al. |
| 7,957,092 B2 | 6/2011 | Ichikawa et al. |
| 8,094,408 B2 | 1/2012 | Uefune et al. |
| 8,205,220 B2 | 6/2012 | Kim et al. |
| 8,279,552 B2 | 10/2012 | Stipe |
| 8,451,559 B1 | 5/2013 | Berding et al. |
| 8,533,934 B2 | 9/2013 | McGuire, Jr. et al. |
| 8,659,849 B2 | 2/2014 | Hayakawa et al. |
| 8,753,093 B2 | 6/2014 | Liotta |
| 8,854,766 B1 | 10/2014 | Gustafson et al. |
| 8,896,964 B1 | 11/2014 | Adachi et al. |
| 9,147,436 B2 | 9/2015 | Watson et al. |
| 2003/0081348 A1 | 5/2003 | Watanabe et al. |
| 2005/0094312 A1 | 5/2005 | Sato |
| 2006/0002005 A1 | 1/2006 | Miyazaki et al. |
| 2006/0034010 A1 | 2/2006 | Abe et al. |
| 2007/0035872 A1 | 2/2007 | Hayakawa et al. |
| 2007/0171567 A1 | 7/2007 | Choi et al. |
| 2007/0177308 A1 | 8/2007 | Kimura |
| 2007/0183085 A1 | 8/2007 | Hatchett et al. |
| 2009/0241322 A1 | 10/2009 | Uefune et al. |
| 2011/0212281 A1 | 9/2011 | Jacoby et al. |
| 2012/0275287 A1 | 11/2012 | McGuire, Jr. et al. |
| 2014/0301043 A1 | 10/2014 | Onishi et al. |
| 2015/0137644 A1 | 5/2015 | Bernett et al. |

OTHER PUBLICATIONS

Anonymous, Top Cover Sealing Structure, Jan. 23, 2014, IP.com, No. IPCOM000234620D, pp. 1-5.*

Top cover sealing structure, The IP.com Prior Art Database, Jan. 23, 2014, 4 pages, IPCOM000234620D, ip.com, downloaded from https://priorart.ip.com/IPCOM/000234620.

Thomas R. Albrecht et al., Adhesive Cover Seal for Hermetically-Sealed Data Storage Device, U.S. Appl. No. 15/168,766, filed May 31, 2016.

Thomas R. Albrecht et al., Adhesive Cover Seal for Hermetically-Sealed Data Storage Device, U.S. Appl. No. 15/168,895, filed May 31, 2016.

Thomas R. Albrecht et al., Adhesive Cover Seal for Hermetically-Sealed Data Storage Device, U.S. Appl. No. 15/169,018, filed May 31, 2016.

S. Fujio et al., Hard Disk Drive Enclosure Sealing for Electromagnetic Noise Immunity, IP.com Prior Art Database, Original Publication Date: Jun. 1, 1994 in IBM Technical Disclosure Bulletin vol. 37 No. 06A, Included in the Prior Art Database: Mar. 27, 2005, IP.com Disclosure No. IPCOM000112786D, IBM, US.

* cited by examiner

HERMETICALLY-SEALED DATA STORAGE DEVICE FOR INCREASED DISK DIAMETER

FIELD OF EMBODIMENTS

Embodiments of the invention may relate generally to data storage devices and more particularly to approaches to use of a larger disk in a standard form factor hermetically-sealed hard disk drive.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

Electronic systems that require a hermetically sealed internal volume (e.g., a lighter-than-air gas filled, sealed HDD) need a way of preventing the occurrence of leakage through the interface between the cover and the corresponding enclosure base to which the cover is coupled. One approach is to utilize two covers, one being the typical HDD cover coupled to the base with fasteners (a "first cover") but not hermetically-sealed, with another cover (a "second cover") being welded or otherwise bonded to the base over the first cover.

Even in view of the benefits that sealing and operating an HDD in helium ambient may offer, increasing areal density remains one of the ever-present goals of hard disk drive design evolution.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a data storage device, and a method to hermetically seal such a device. With the data storage device, the inner surfaces of a plurality of sidewalls of a second cover overlap with and are adhesively bonded with the outer surfaces of a plurality of sidewalls of an enclosure base having an uppermost top surface, where the second cover or an underlying supporting element are removably adhered to the uppermost top surface of the base. The removable adhesive bond may comprise a pressure-sensitive adhesive, which can provide for reworkability during the manufacturing and testing process. Furthermore, the second cover-to-base sidewall bond may form a hermetic seal between the second cover and the base. According to embodiments, the foregoing configuration may provide for a thinner base sidewall adjacent to the recording disk(s), leaving more space available for larger-diameter recording disks within a standard form factor, hermetically-sealed storage device, which may be filled with a lighter-than-air gas.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to use of a larger disk in a standard form factor, hermetically-sealed data storage device (e.g., a hard disk drive or optical disk drive) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a hard disk drive (HDD) storage device. Thus, in accordance with an embodiment, a plan view illustrating an HDD 100 is shown in FIG. 1 to illustrate an exemplary operating context.

Figure 1:
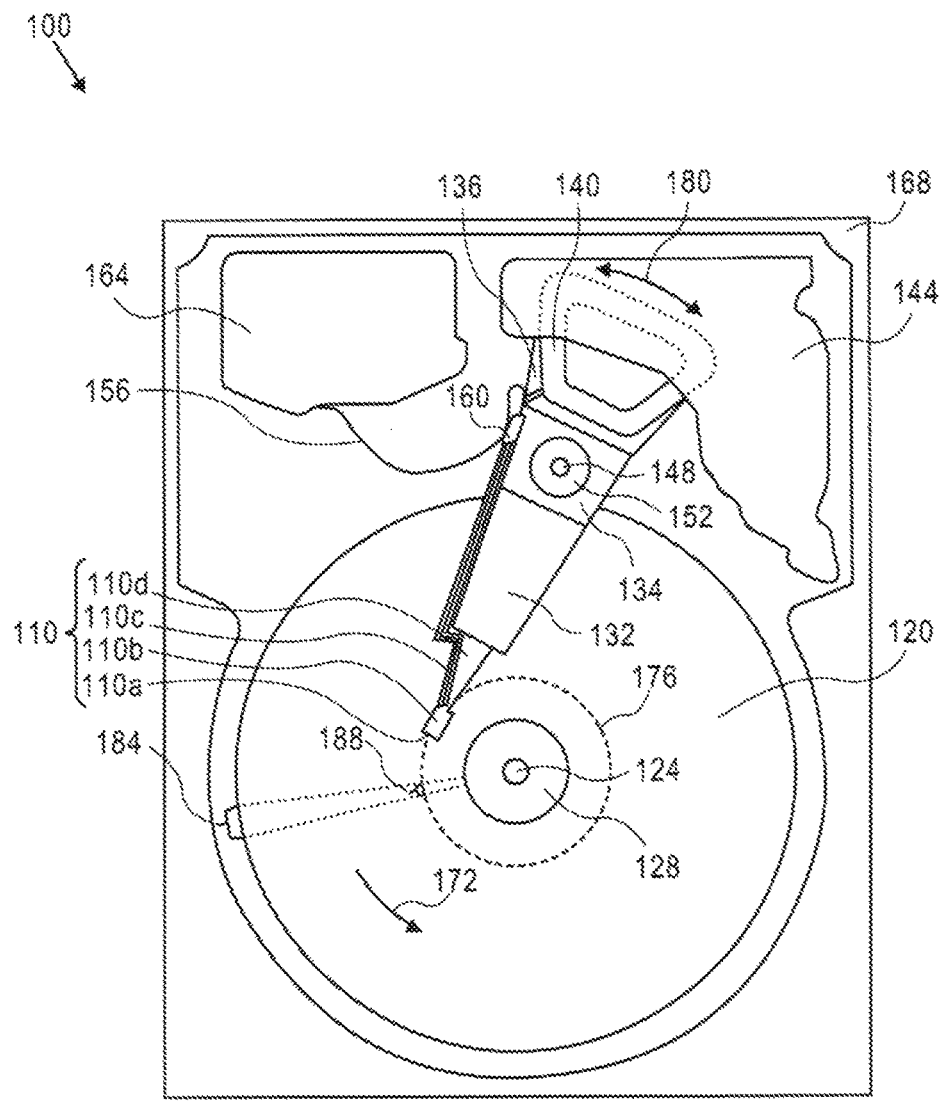
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a sidewall as "substantially vertical" would assign that term its plain meaning, such that the sidewall is vertical for all practical purposes but may not be precisely at 90 degrees.

Recall that electronic systems that require a hermetically sealed internal volume (e.g., a lighter-than-air gas filled, sealed HDD) need a way of preventing the occurrence of leakage through the cover-to-base interface, with one approach being to utilize two covers, the second of which may be laser welded to the base over the first cover.

Figure 2:
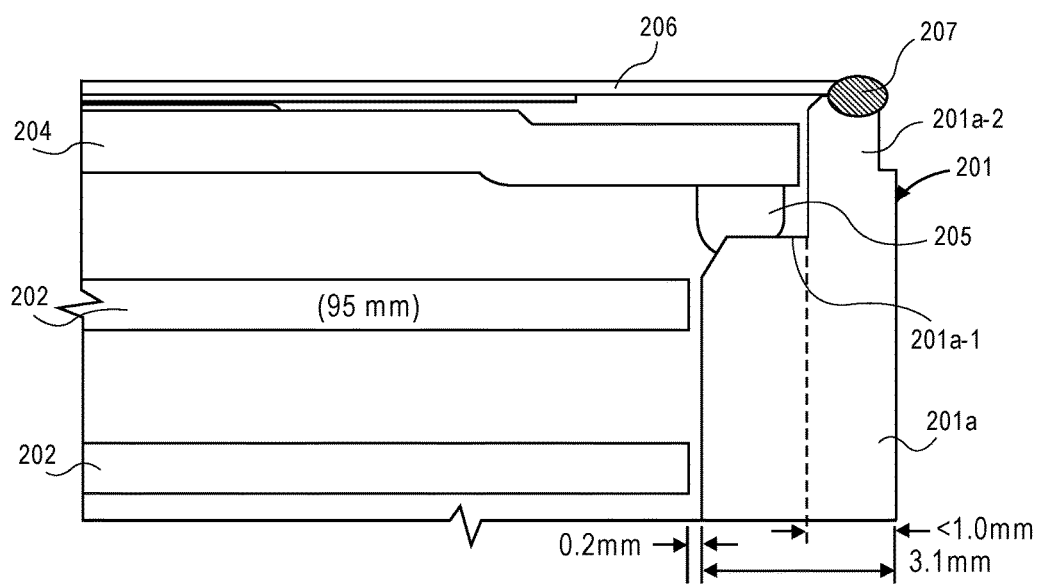
FIG. 2 is a cross-sectional side view illustrating a conventional hermetically-sealed data storage device.

FIG. 2 is a cross-sectional side view illustrating a conventional hermetically-sealed data storage device. Consider, for example, that a 3.5" form factor HDD has an enclosure perimeter approximately 500 mm long. If a simple flat metal cover is attached to the tops of the vertical sidewalls of a tub-style base 201, the width of the joint might typically be around 1 mm, or perhaps 2 mm at most. The sidewalls 201a of the base 201 are typically 5 mm thick or less, to provide room for internal components. In particular, and as depicted in FIG. 2, the regions where the sidewalls 201a pass by the outer diameter (OD) of the disk stack must be especially thin (about 3.1 mm thick) simply because of the size of a conventional disk 202 (e.g., 95 mm diameter), the width of the form factor (101.6 mm) and provisioning for minimal clearance between the base 201 sidewalls 201a and the rotating disks 202 (e.g., 0.2 mm). Furthermore, the full width of a base 201 sidewall 201a generally cannot be used to create a sealing face for a cover.

The assembly process for a hermetically-sealed data storage device (e.g., a hard disk drive) may involve first attaching an inner ("first") cover 204 with a preliminary gasket seal 205, followed by servo-writing and manufacturing test, which has imperfect yield so performing these while the second cover is not in place allows reworkability. The foregoing process is then followed by attaching a hermetically-sealed second cover 206, after which the device is no longer reworkable because the second cover seal/attachment is not reversible. Because the preliminary gasket seal 205 of the first cover 204 generally requires some sidewall 201a top face width to achieve a seal, the amount of remaining sidewall 201a top face width is reduced to around only 1 mm or less at the narrowest points next to the disk 202 OD. As shown, the top of the sidewall 201a comprises two features: (a) a step 201a-1 for the gasket seal 205 for the first cover 204, and (b) a rib 201a-2 that protrudes to nearly the top of the device, to above the first cover 204, to serve as a narrow surface against which the second cover 206 sits, and to which the second cover 206 is laser welded with laser weld 207 to form the final permanent hermetic seal.

If the disk diameter is increased from 95 mm to 97 mm, then there only remains 4.6 mm total (i.e., both sides) to be shared between disk clearance and sidewall width, compared to 6.6 mm as depicted in FIG. 2. If the disk clearance is held at 0.2 mm, then that leaves a mere 2.1 mm for the base sidewall width in each of the areas/sides immediately adjacent to the disk stack.

Top Sidewall Surface First Cover Seal

Figure 3:
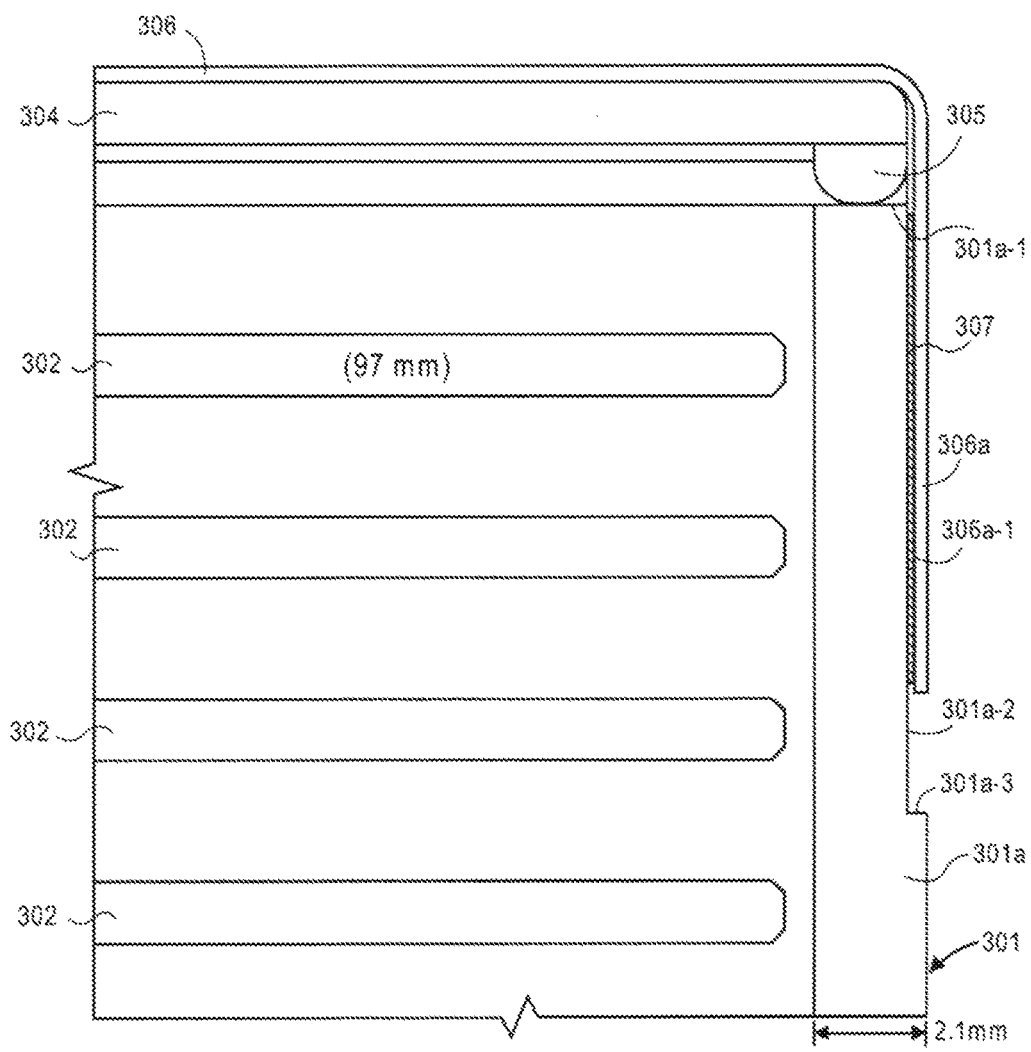
FIG. 3 is a cross-sectional side view diagram illustrating a hermetically-sealed data storage device, according to a first embodiment.

FIG. 3 is a cross-sectional side view diagram illustrating a hermetically-sealed data storage device, according to a first embodiment. Continuing with the foregoing dimensional example (e.g., employing a 97 mm disk, such as disk 302), the width of a sidewall 301a of a base 301 is at or around 2.1 mm. Hence, according to this first embodiment, the "side-by-side" pair of seals (e.g., the gasket 205 and the laser weld 207 of FIG. 2) is replaced with a "stacked" pair of seals. This stacked pair of seals is depicted in FIG. 3 as a gasket seal 305, to seal a first cover 304, and a hermetic seal 307, to seal a second cover 306. According to an embodiment, the sidewall 301a comprises an uppermost top surface 301a-1 and an outer surface 301a-2, where the gasket seal 305 is positioned (or "sandwiched") between the first cover 304 and each uppermost top surface 301a-1 of the sidewall 301a of the base 301.

According to an embodiment, the shape of the second cover 306, and its hermetic sealing approach, are different from the configuration depicted in FIG. 2. That is, the second cover 306 hermetic seal 307 is moved down to between the outer surface 301a-2 of the sidewall 301a of the base 301 and an inner surface 306a-1 of the sidewall 306a of the second cover 306, which eliminates the need for the rib 201a-2 (FIG. 2) to facilitate the laser weld 207 (FIG. 2). Hence, the uppermost top surface 301a-1 of the sidewall 301a of the base 301 is used for the gasket seal 305.

The manner in which the outer surface 301a-2 is formed may vary from implementation to implementation. That is, the sidewall 301a may be formed with an outer step 301a-3 (as depicted), providing a recessed area in which the sidewall 306a of the second cover 306, along with the hermetic seal 307, may be recessed. In the foregoing scenario, the outer surface 301a-2 is not necessarily the outermost surface of the sidewall 301a. Alternatively, the sidewall 301a may be formed without the outer step 301a-3 and the corresponding recessed area, a scenario in which the outer surface 301a-2 is the outermost surface of the sidewall 301a.

According to an embodiment, the second cover 306 comprises what is referred to as a "tub cover", which is essentially an inverted tub shape with downward extending thin sidewalls 306a that overlap with the outer surface 301a-2 of the base 301 sidewalls 301a. The laser weld 207

(FIG. 2) may be replaced with a polymeric seal, such as an epoxy or similar adhesive, a pressure-sensitive adhesive (PSA), or a heat seal (which utilizes a heat-sealing material which, when heating the cover 306 and base 301 assembly, reflows the heat-sealing material).

All of the foregoing sealing approaches would benefit from a narrow bond line and a wide seal extent (shown oriented vertically in FIG. 3, so it may be referred to as a seal height), so a substantial overlap of the sidewalls 306a of the second cover 306 and the sidewalls 301a of the base 301 are to be considered. Furthermore, achieving a low enough leak rate for a cover seal, such as hermetic seal 307, may or should involve the following considerations, according to embodiments: (a) in the case of an epoxy adhesive seal, a low permeability epoxy adhesive such as alumina-filled H72 epoxy from Epoxy Technology (EpoTek), for a non-limiting example; (b) the seal 307 thickness between the cover 306 and the base 301 is very thin, e.g., around 0.1 mm or less; and (c) the seal 307 height (i.e., the overlap region between the cover 306 and the base 301) is long, e.g., around 5-10 mm or more (thus having a height/thickness ratio of 50-100:1). Achieving a bond line having a thickness of approximately 0.05-0.1 mm is thought to be achievable with typical machined surfaces and commercially available epoxy. In the case of a PSA-based seal 307, the seal 307 could be around 0.05 mm thick by 20 mm high, for a non-limiting example, thus having a height/thickness ratio of around 400:1.

Removably-Adhered Cover

Figure 4A:
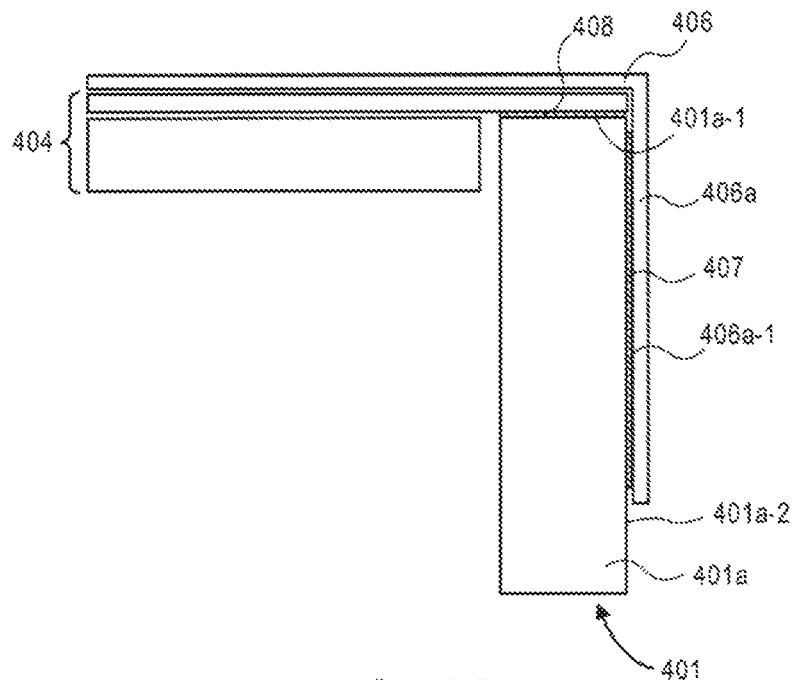
FIG. 4A is a cross-sectional side view diagram illustrating a hermetically-sealed data storage device, according to a second embodiment.

FIG. 4A is a cross-sectional side view diagram illustrating a hermetically-sealed data storage device, according to a second embodiment. The data storage device of FIG. 4A comprises a first cover 404 mated with a base 401 and a second cover 406, positioned over the first cover 404, and comprising a plurality of sidewalls 406a each extending from a top portion and having an inner surface 406a-1. According to an embodiment, the first cover 404 is removably adhered, via a first adhesive 408, to an uppermost top surface 401a-1 of the base 401.

According to an embodiment, the first adhesive 408 comprises a thin removable sticker, such as a sheet or foil with PSA. Although the PSA sticker seal is not a very wide seal over the uppermost top surface 401a-1 of the base 401, the first adhesive 408 provides sufficient sealing capability to retain a lighter-than-air gas throughout the manufacturing and testing processes. If during testing the device is found to be defective and in need of rework, then the first cover 404 can be removed (and possibly reused) and the first adhesive 408 can be cleanly removed (provided a PSA material with clean peel-off is used). Devices that pass all the testing can then receive the second cover 406, the same as or similarly to as described in reference to FIG. 3. That is, the hermetic seal 407 (e.g., a "second adhesive") may be formed between each respective overlapping outer surface 401a-2 (or at least a portion) of the sidewall 401a of the base 401 and a corresponding inner surface 406a-1 (or at least a portion) of the sidewall 406a of the second cover 406.

Figure 4B:
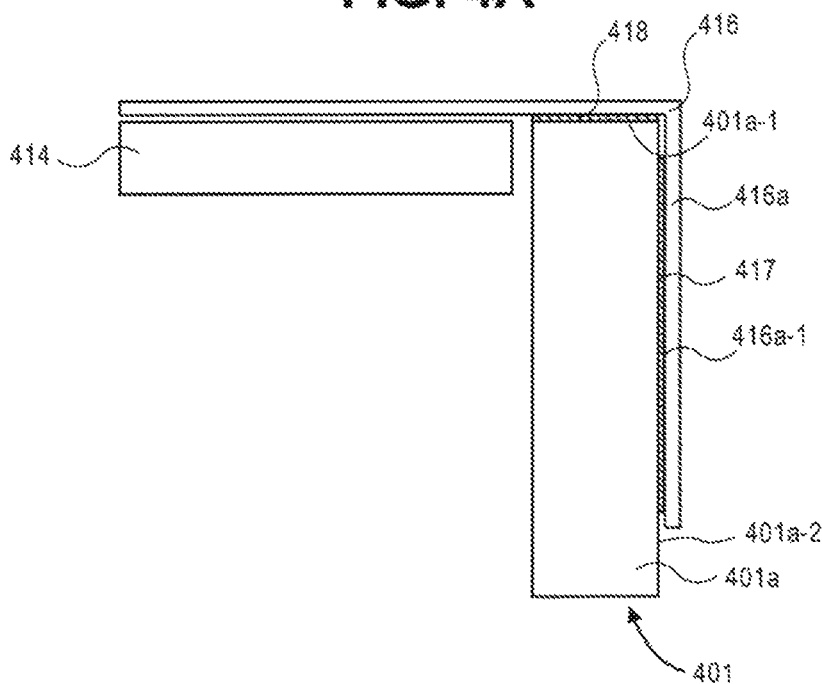
FIG. 4B is a cross-sectional side view diagram illustrating a hermetically-sealed data storage device, according to a third embodiment.

FIG. 4B is a cross-sectional side view diagram illustrating a hermetically-sealed data storage device, according to a third embodiment. The data storage device of FIG. 4B comprises a first cover 414 (a type of "supporting member") mated with a base 401 and a second cover 416, positioned over the first cover 414, and comprising a plurality of sidewalls 416a each extending from a top portion and having an inner surface 416a-1. According to an embodiment, the second cover 416 is removably adhered, via a first adhesive 418, to an uppermost top surface 401a-1 of the base 401.

According to an embodiment, rather than employing a first cover such as first cover 414, a "structural member" (a type of "supporting member") is mated with and/or attached to the base to provide stiffening and attachment support for one or more data storage components, such as the VCM and/or the disk spindle (e.g., spindle 124 of FIG. 1)/spindle motor. Thus, the structural member may be designed to span or mate with two or more sidewalls of the base, but to be less than a full first cover. Furthermore, the structural member may be composed of multiple pieces. As such, the structural member may mate with the uppermost top surface of at least a portion of two or more sidewalls of the base, but not necessarily provide for temporary sealing the enclosure as a first cover would. Still further, it is contemplated that the structural member and the second cover 416 are combined into a single cover assembly or constructed as a unitary part.

According to an embodiment, the first adhesive 418 comprises a thin removable sticker, such as a sheet or foil with PSA, where the first adhesive 418 provides sufficient sealing capability to retain a lighter-than-air gas throughout the manufacturing and testing processes. As with the configuration illustrated in FIG. 4A, if during testing the device is found to be defective and in need of rework, then the first cover 414 can be removed (and possibly reused) and the first adhesive 418 can be cleanly removed (provided a PSA material with clean peel-off is used). Devices that pass all the testing can then receive the second cover 416, the same as or similarly to as described in reference to FIG. 3. That is, the hermetic seal 417 (e.g., a "second adhesive") may be formed between each respective overlapping outer surface 401a-2 (or at least a portion) of the sidewall 401a of the base 401 and a corresponding inner surface 416a-1 (or at least a portion) of the sidewall 416a of the second cover 416.

Hence, according to this embodiment, the second cover 416 is associated with two different types of seals: (1) the first adhesive 418 seal that sticks to the uppermost top surface 401a-1 of the base 401 sidewall 401a, and which is cleanly removable in case the device needs to be reworked, and (2) the hermetic seal 417, which is considered "permanent" and is applied after final tests are complete. Thus, the second cover 416 serves both for the temporary seal (i.e., first adhesive 418) and the "permanent" seal (i.e., hermetic seal 417). While the hermetic seal 417 may be referred to herein as "permanent", a hermetic seal 417 that may be removed for drive rework is contemplated, such as with a PSA-based hermetic seal 417.

According to an embodiment, a suitably configured hard disk drive based on the foregoing described embodiments may utilize a larger-than-conventional recording disk, i.e., a 97 mm diameter disk as previously exemplified. Furthermore, a suitably configured hard disk drive based on the foregoing described embodiments can utilize a 97 mm recording disk and still hermetically seal such a device having only about 2.1 mm of base sidewall thickness to work with. Still further, although the embodiments described have been set in the exemplary context of a 3.5' form factor device, similar concepts may apply to other form factors with appropriate scaling.

Hermetic Sealing Adhesive Materials

According to embodiments, the hermetic seal 307 (FIG. 3), 407 (FIG. 4A), 417 (FIG. 4B) may comprise, respectively, an epoxy, a pressure-sensitive adhesive, or a heat seal.

As a variety of adhesives exist, one fundamental characteristic to consider in selecting a suitable adhesive for forming a hermetic seal between or among a second cover 306, 406, 416 and a base 301, 401 in a helium-filled data storage device, such as a hard disk drive (HDD) is for the adhesive to have a low permeability to helium. Likewise, if some other lighter-than-air gas is used for filling a data storage device, the adhesive's permeability to that gas would be a characteristic to consider.

With a proper joint design, epoxies have a sufficient permeability to helium to create an effective helium seal. Epoxies can be applied in liquid form, or as a tacky film pre-applied to a part (i.e., "B-staged"). In the liquid form, the epoxy can be applied to a part before the parts are assembled together if a high viscosity formulation is used. Alternatively, a low viscosity liquid epoxy can be drawn into the seal using capillary action (or "capillary flow"), referring to the tendency of a liquid to flow or be drawn into narrow spaces without the assistance of external forces. While other adhesives, such as PSAs, generally have a higher permeability than epoxies, at least one type (Adhesive Research PSA EL-92734) can still meet the application requirements. Such adhesives can be applied prior to mating the parts, and typically do not require a curing step after joining of the mating parts and, therefore, are preferred in that sense.

For embodiments in which a liquid epoxy seal is used, the flow of the epoxy should preferably be managed. Furthermore, an epoxy seal requires substantial curing time (e.g., minutes to tens of minutes) at an elevated temperature. During curing, the surfaces may need to be held together by clamping or other means (such as a self-inward-bias on the second cover sidewalls that press against the base sidewalls). Cycle time may be significant, and if external clamping is needed, tooling cost may be relatively high.

For embodiments in which a PSA seal is used, the second cover 306, 406, 416 or the base 301, 401 may have the PSA pre-applied as a backing. A PSA seal is instant, and requires no clamping. However, although certain PSA materials have been demonstrated to have adequate helium sealing capability, their adhesion/cohesion may not be ideal for external vacuum leak testing that may be performed as a final step on helium sealed drives. Hence, a method of holding the PSA seals tight against the base sidewalls may be beneficial during leak testing, which increases complexity and tooling cost, and could possibly compromise the effectiveness of the test itself.

For a heat seal, heat-sealing material may be coated on the inner surface 306a-1 (FIG. 3), 406a-1 (FIG. 4A), 416a-1 (FIG. 4B) of the second cover 306 (FIG. 3), 406 (FIG. 4A), 416 (FIG. 4B), where it will seal against the base 301 (FIG. 3), 401 (FIG. 4) by flowing and adhering to the outer surface 301a-2 (FIG. 3), 401a-2 (FIGS. 4A, 4B) of the base sidewall 301a (FIG. 3), 401a (FIGS. 4A, 4B) when temporarily heated under pressure above its flow temperature. Unlike epoxy, heat-sealing material can facilitate a rapid cycle time (e.g., less than a minute to a couple of minutes for heating and cooling). It may be beneficial to apply pressure during the short heat cycle during which the seal itself is formed.

Seal Configurations

Generally, the path of an adhesive seal can take multiple forms. For example, an epoxy seal between a tub cover and a base may follow a simple path around the perimeter of the sidewalls of the base and a tub cover. In such an adhesive seal configuration, it is preferable that the tub cover has a complete tub shape (i.e., having continuous sidewalls, including corners) and a suitable seal all the way around the perimeter, including the corners.

Figure 5:
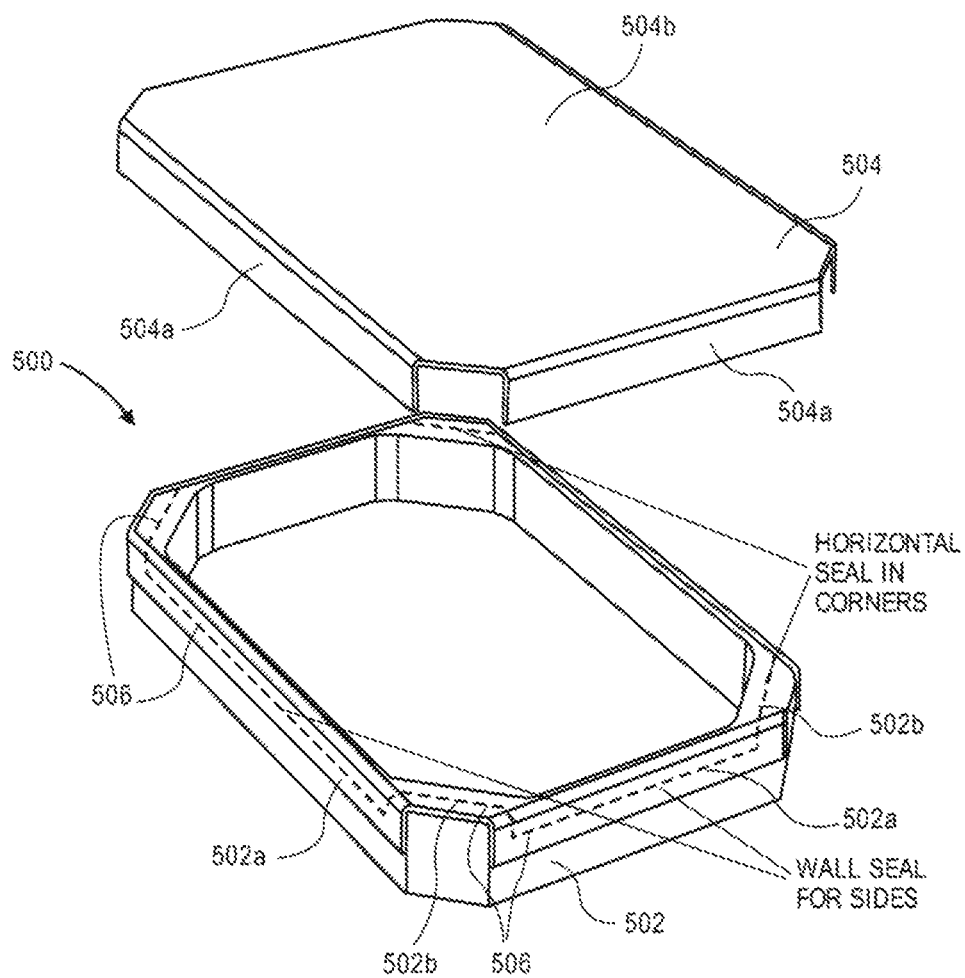
FIG. 5 is an exploded view illustrating a hermetically-sealed data storage device cover over-wrap approach, according to an embodiment.

FIG. 5 is an exploded view illustrating a hermetically-sealed data storage device cover over-wrap approach, according to an embodiment. For sake of simplicity and clarity, FIG. 5 depicts an exploded cover 504 over an assembled device 500, which comprises the cover 504 mated with a base 502 to show an assembled seal configuration, omitting the depiction of any internal components and omitting a first cover. Reference is made to FIG. 1 for a description of other components of a hard disk drive that may be implemented in or with the assembled device 500. With a "cover over-wrap" approach, according to an embodiment, the seal 506 may be formed along the sidewalls 502a of the base 502 and the sidewalls 504a of the cover 504 for the long straight parts of the sidewalls (denoted as "wall seal"), and then be formed up over the top in the corners (denoted as "horizontal seal"). In the corners, the seal 506 is between corner surfaces 502b on the base 502 and the planar top portion 504b of the cover 504. This more complex path allows for covers with open corners (e.g., bent/folded sheet metal covers, such as 504), or tub covers which do not seal well in the corners. The horizontal corner surfaces 502b of the base 502 should be wide enough so that a seal width of at least several millimeters wide (preferably around 10 mm wide, according to an embodiment) can be achieved, as it is along the sidewalls (e.g., sidewalls 502a of base 502).

A Method of Hermetically Sealing a Data Storage Device

Figure 6:
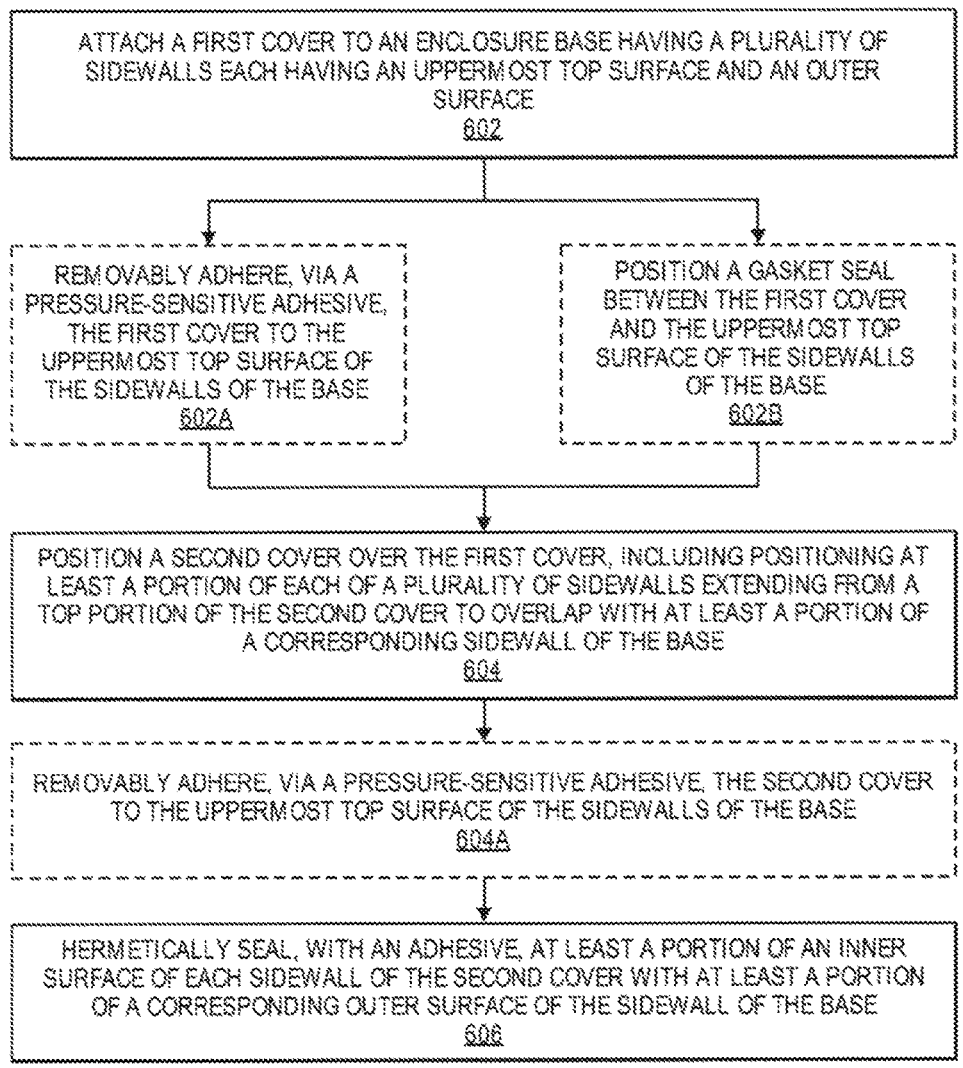
FIG. 6 is a flow diagram illustrating a method of hermetically sealing a data storage device, according to an embodiment.

FIG. 6 is a flow diagram illustrating a method of hermetically sealing a data storage device, according to an embodiment. The method of FIG. 6 is described with reference to FIGS. 3, 4A, and 4B.

At block 602, a first cover is attached to an enclosure base having a plurality of sidewalls, where each sidewall has an uppermost top surface and an outer surface. For example, first cover 304 (FIG. 3), 404 (FIG. 4A), 414 (FIG. 4B) is attached to the base 301 (FIG. 3), 401 (FIGS. 4A, 4B), where the base 301, 401 comprises a plurality of sidewalls 301a (FIG. 3), 401a (FIGS. 4A, 4B), and where each sidewall 301a, 401a has an uppermost surface 301a-1 (FIG. 3), 401a-1 (FIGS. 4A, 4B) and an outer surface 301a-2 (FIG. 3), 401a-2 (FIGS. 4A, 4B). Alternatively at block 602, according to an embodiment, a structural member is attached to the enclosure base rather than a full first cover, as described in reference to FIG. 4B.

According to an embodiment, one approach to block 602 is depicted as alternative block 602A (shown as optional with dashed box in FIG. 6), at which the first cover is removably adhered, via a pressure-sensitive adhesive (PSA), to the uppermost top surface of the sidewalls of the base. For example, first cover 404 is removably attached to the uppermost top surface 401a-1 of the base 401 using a pressure-sensitive first adhesive 408 (FIG. 4A).

According to another embodiment, another approach to block 602 is depicted as alternative block 602B (shown as optional with dashed box in FIG. 6), at which a gasket seal is positioned between the first cover and the uppermost top surface of the sidewalls of the base. For example, gasket seal 305 (FIG. 3) is positioned between the first cover 304 and the uppermost top surface 301a-1 of the base 301.

At block 604, a second cover is positioned over the first cover, including positioning at least a portion of each of a plurality of sidewalls extending from a top portion of the second cover to overlap with at least a portion of a corresponding sidewall of the base. For example, second cover 306, 406, 416 is positioned over the first cover 304, 404, 414, including positioning at least a portion of each of a plurality of sidewalls 306a (FIG. 3), 406a (FIG. 4A), 416a (FIG. 4B) extending from a top portion of the second cover 306, 406, 416 to overlap with at least a portion of a corresponding sidewall 301a, 401a of the base 301, 401.

According to an embodiment, one approach to block 604 is depicted as alternative block 604A (shown as optional with dashed box in FIG. 6), at which the second cover is removably adhered, via a pressure-sensitive adhesive (PSA), to the uppermost top surface of the sidewalls of the base. For example, second cover 416 is removably attached to the uppermost top surface 401a-1 of the base 401 using a pressure-sensitive first adhesive 418 (FIG. 4B).

At block 606, at least a portion of an inner surface of each sidewall of the second cover is hermetically sealed, with an adhesive, with at least a portion of a corresponding outer surface of the sidewall of the base. For example, at least a portion of an inner surface 306a-1 (FIG. 3), 406a-1 (FIG. 4A), 416a-1 (FIG. 4B) of each sidewall 306a, 406a, 416a of the second cover 306, 406, 416 is hermetically sealed, with an adhesive hermetic seal 307 (FIG. 3), 407 (FIG. 4A), 417 (FIG. 4B), with at least a portion of a corresponding outer surface 301a-2, 401a-2 of the sidewall 301a, 401a of the base 301, 401.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
   an enclosure base having a plurality of sidewalls each having an uppermost top surface and an outer surface;
   a supporting member mated with said base, wherein said supporting member provides attachment support for a disk spindle; and
   a second cover positioned over said supporting member, said second cover comprising a plurality of sidewalls extending from a top portion with each sidewall having an inner surface;
   wherein said supporting member or said second cover is removably adhered, via a first adhesive, to said uppermost top surface of at least a portion of two or more said sidewalls of said base;
   wherein at least a portion of each said sidewall of said second cover overlaps with at least a portion of a corresponding said sidewall of said base;
   wherein at least a portion of said inner surface of each said sidewall of said second cover is bonded, via a second adhesive, with at least a portion of said outer surface of each said sidewall of said base;
   wherein said first adhesive is different from said second adhesive.

2. The data storage device of claim 1, wherein said supporting member is a first cover that, in conjunction with said first adhesive, provides a temporary seal for said data storage device by adhering to said uppermost top surface of each said sidewall of said base.

3. The data storage device of claim 1, wherein said supporting member is a structural member that mates with said uppermost top surface of at least said portion of said two or more sidewalls of said base.

4. The data storage device of claim 1, wherein said second cover is removably adhered, via said first adhesive, to said uppermost top surface of each said sidewall of said base.

5. The data storage device of claim 1, wherein said supporting member and said second cover are constructed as a unitary part.

6. The data storage device of claim 1, further comprising:
   at least one recording disk rotatably mounted on said spindle, wherein an outer diameter of said recording disk is approximately 97 millimeters.

7. The data storage device of claim 6, wherein a maximum thickness of each said sidewall of said base immediately adjacent to said recording disk is approximately 2.1 millimeters.

8. The data storage device of claim 1, wherein said second adhesive forms a hermetic seal between said second cover and said base.

9. The data storage device of claim 8,
   wherein said hermetic seal has a ratio between a height and a thickness in a range of 50-400:1, thereby forming said hermetic seal having a long, narrow diffusion path inhibiting diffusion of gas through said second adhesive.

10. The data storage device of claim 1, wherein said first adhesive comprises a pressure-sensitive adhesive temporarily sealing said supporting member to said uppermost top surface of at least said portion of said two or more sidewalls of said base.

11. The data storage device of claim 1, wherein said first adhesive comprises a pressure-sensitive adhesive temporarily sealing said second cover to said uppermost top surface of each said sidewall of said base.

12. The data storage device of claim 1, wherein said second adhesive comprises an epoxy adhesive.

13. The data storage device of claim 1, wherein said second adhesive comprises a pressure-sensitive adhesive.

14. The data storage device of claim 1, wherein said second adhesive comprises a heat-sealing material.

15. The data storage device of claim 1, wherein a plurality of corner portions of said top portion of said second cover are adhesively bonded with a respective plurality of substantially planar corner portions of said base.

* * * * *